United States Patent [19]
Nakayama et al.

[11] Patent Number: 5,498,485
[45] Date of Patent: Mar. 12, 1996

[54] MAGNETO-OPTICAL RECORDING MEDIUM AND MANUFACTURING METHOD THEREOF

[75] Inventors: Junichiro Nakayama; Hiroyuki Katayama; Junji Hirokane; Michinobu Mieda, all of Nara, Japan

[73] Assignee: Sharp Kabushiki Kaisha, Osaka, Japan

[21] Appl. No.: 207,054

[22] Filed: Mar. 8, 1994

Related U.S. Application Data

[63] Continuation-in-part of Ser. No. 3,723, Jan. 13, 1993, abandoned.

[30] Foreign Application Priority Data

Jan. 21, 1992 [JP] Japan .................. 4-008498

[51] Int. Cl.$^6$ .............. G11B 5/66; G11B 11/00
[52] U.S. Cl. .......... 428/694 ML; 428/694 SC; 428/694 RE; 428/694 DE; 428/694 MM; 428/694 EC; 428/900; 369/13
[58] Field of Search ............ 428/694 EC, 694 ML, 428/694 MM, 900, 694 SC, 694 RE, 694 DE; 369/13

[56] References Cited

FOREIGN PATENT DOCUMENTS

| | | |
|---|---|---|
| 258978 | 3/1988 | European Pat. Off. . |
| 282356 | 3/1988 | European Pat. Off. . |
| 0282356 | 3/1988 | European Pat. Off. . |
| 352548 | 7/1989 | European Pat. Off. . |
| 0352548 | 7/1989 | European Pat. Off. . |
| 1155534 | 6/1989 | Japan . |
| 155534 | 6/1989 | Japan . |
| 19155 | 1/1991 | Japan . |
| 3019155 | 1/1991 | Japan . |
| 195750 | 7/1992 | Japan . |
| 4195750 | 7/1992 | Japan . |

OTHER PUBLICATIONS

Kaneko et al; Jap. J. Appl. Phys., vol. 28; Supp. 28–3, pp. 27–31, 1989.
Iida et al; Jap. J. Appl. Phys., vol. 28; Supp. 28–3, pp. 367–370, 1989.
Hatwar et al., J. Appl. Phys. vol. 70, No. 10; Nov. 1991, pp. 6439–6441.
Kaneko et al "The Interface Wall Structure of Magnetic Triple–Layer Film for Overwriting by Light Intensity Modulation" Jap. Jour. Appl. Phys., vol. 28, No. 3, 1989, pp. 27–31.
"Control of Exchange Coupling for Direct Overwrite Media Using Pd Metal Interlayer", Hatwar et al., Journal of Applied Physics, vol. 70, No. 10, Nov. 1991, pp. 6439–6441.
"The Interface Wall Structure of Magnetic Triple–Layer Film for Overwriting by Light Intensity Modulation", Kaneko et al., Japanese Journal of Applied Physics, vol. 28, No. 3, 1989, pp. 27–31.
Masahiko Kaneko et al, Japanese Journal of Applied Physics, vol. 28, Supp. 28–3, pp. 27–31, 1989.
Haruhisa Iida et al, Japanese Journal of Applied Physics, vol. 28, Supp. 28–3, pp. 367–370, 1989.

Primary Examiner—Leszek Kiliman

[57] ABSTRACT

A magneto-optical recording medium has a recording layer including two magnetic layers. The magneto-optical recording medium satisfies a condition of $|A_1.K_1 - A_2.K_2| \leq 0.18$ (erg$^2$/cm$^4$) wherein $A_1$, $K_1$, $A_2$, and $K_2$ respectively represent an exchange constant of a first magnetic layer, a perpendicular magnetic anisotropy of the first magnetic layer, an exchange constant of a second magnetic layer, and a perpendicular magnetic anisotropy of the second magnetic layer. First and Second magnetic layers are made of TbFeCo.

15 Claims, 9 Drawing Sheets

MAGNETO-OPTICAL RECORDING MEDIUM AND MANUFACTURING METHOD THEREOF

This application is a continuation-in-part application of U.S. application Ser. No. 08/003,723, filed on Jan. 13, 1993, now abandoned.

FIELD OF THE INVENTION

The present invention relates to a magneto-optical recording medium such as an optical disk or an optical card and a manufacturing method thereof, the magneto-optical recording medium being arranged such that information recorded thereon is reproduced utilizing a magneto-optical effect.

BACKGROUND OF THE INVENTION

When a magneto-optical recording method is adopted, a recording medium is employed which includes a substrate having thereon a perpendicular magnetic film made of a magnetic substance, and recording and reproducing operations on and from the recording medium are performed in the following way.

When a recording operation is to be carried out, first, the magnetization direction of the recording medium is arranged in one direction (upward or downward) by applying thereto a strong external magnetic field so as to initialize the recording medium. Then, a laser beam is projected onto a recording area of the recording medium so as to raise a temperature thereof above the vicinity of its Curie temperature or above the vicinity of its compensation temperature. As a result, a coercive force (Hc) at the heated portion becomes zero or substantially zero. Further, an external magnetic field (bias magnetic field) having an opposite direction to an initialization magnetic direction is applied, thereby reversing the magnetization direction. Then, the projection of the laser beam is stopped. As the temperature of the recording medium drops to a room temperature, the reversed magnetization direction is fixed, thereby recording information thermomagnetically.

When a reproducing operation is to be carried out, a linearly polarized laser beam is projected onto the recording medium, and the recorded information is optically read out utilizing an effect that the polarization plane of a reflected light or transmitted light rotates differently depending on the magnetization direction (magnetic Kerr effect, or magnetic Faraday effect).

The magneto-optical recording medium designed for the magneto-optical recording method has been viewed with interest as a rewritable high density and large capacity memory device. In order to rewrite on the magneto-optical recording medium, either one of the following methods (a), (b), and (c) is required.

(a) initializing through any method;

(b) devising an external magnetic field (bias magnetic field) generation device so as to enable the overwriting operation (rewriting operation without requiring an erasing operation); and (c) devising the recording medium so as to enable the overwriting operation (rewriting operation without requiring an erasing operation).

However, when the method (a) is adopted, either an initialization device is required, or two magnetic heads are required, thereby presenting the problem of high cost. Or when erasing using only one magnetic head, there arises the problem that the erasing operation requires the same amount of time required for recording. On the other hand, when the method (b) is adopted, the magnetic head may be crushed as in the case of the magnetic recording.

Thus, the method (c) of devising the recording medium is the most effective method. As for this method, by employing a double-layered exchange coupled film for a recording layer, the overwriting operation is enabled as reported by Akasaka et al (for example, see Jap. Jour. Appl. Phys., Vol. 28 (1989) Suppl. 28-3, pp. 367–370).

The processes for the overwriting operation will be briefly described below. As shown in FIG. 16, in the magneto-optical recording medium composed of a first magnetic layer 56 and a second magnetic layer 57, an initialization magnetic field $H_{ini}$ is applied thereto so as to arrange the magnetization in the second magnetic layer 57 in one direction (downward in the figure) in order to initialize the recording medium. Here, the initialization may always be performed or performed only when recording. In this state, since a coercive force $H_1$ of the first magnetic layer 56 is greater than the initialization magnetic field $H_{ini}$, the magnetization in the first magnetic layer 56 needs not be reversed as shown in FIG. 18.

A recording operation is performed by projecting a laser light which is to be switched between a high level and a low level, while applying a recording magnetic field $H_w$. In more detail, a laser beam of the high level denoted by I in FIG. 17 is set so as to raise both the temperatures of the first magnetic layer 56 and the second magnetic layer 57 to the temperature $T_H$ which is in the vicinity of the Curie temperature $T_2$ or above the Curie temperature $T_2$. On the other hand, a laser beam of the low level denoted by II in FIG. 17 is set so as to raise only the temperature of the first magnetic layer 56 to the temperature $T_L$ which is in the vicinity of its Curie temperature $T_1$ or above the Curie temperature $T_1$.

Therefore, when projecting the laser beam of the high level I, the magnetization in the second magnetic layer 57 is reversed (upward in FIG. 16) by applying thereto the recording magnetic field $H_w$. Then, the magnetization in the first magnetic layer 56 is also reversed in the magnetization direction of the second magnetic layer 57 using an exchange force exerted on an interface in the process of cooling off.

On the other hand, when projecting the laser beam of the low level II, the magnetization direction in the second magnetic layer 57 is not reversed by the recording magnetic field $H_w$. In this case also, the magnetization direction in the first magnetic layer 56 is arranged in the magnetization direction of the second magnetic layer 57 in the process of cooling off. Thus, the magnetization direction in the first magnetic layer 56 shows downward in FIG. 16. Additionally, the recording magnetic field $H_w$ is set significantly smaller than the initialization magnetic field $H_{ini}$ as shown in FIG. 18. Furthermore, as denoted by III of FIG. 17, the intensity of the laser beam used in reproducing is set significantly lower than the laser beam used in recording.

However, when the above method is adopted, a large initialization magnetic field is required. Or if a double-layered film which makes the initialization magnetic field smaller is employed, a stable recording operation cannot be preformed, and therefore it is not possible to perform an overwriting operation. In order to counteract this, a three-layered recording layer may be adopted having an intermediate layer between two exchange coupled films (for example, see Jap. Jour. Appl. Phys., Vol. 28(1989) Suppl. 28-3, pp. 27–31). However, the three-layered recording layer presents the problems of an increase in the manufacturing cost and complicated manufacturing process.

SUMMARY OF THE INVENTION

An object of the present invention is to provide a magneto-optical recording medium and a manufacturing method thereof, which permits a stable recording operation using a small initialization magnetic field even when adopting a recording layer of a double-layer structure.

In order to achieve the above object, the magneto-optical recording medium is characterized by having a recording layer including at least two magnetic layers, and satisfying a condition of $|A_1.K_1-A_2.K_2| \leq 0.18$ (erg$^2$/cm$^4$) wherein $A_1$, $K_1$, $A_2$, and $K_2$ respectively represent an exchange constant of a first magnetic layer, a perpendicular magnetic anisotropy of the first magnetic layer, an exchange constant of a second magnetic layer, and a perpendicular magnetic anisotropy of the second magnetic layer.

According to the above arrangement, even when the applied magnetic field becomes zero, the Faraday rotation angle of the recording layer will not change. For example, the applied magnetic field may become zero by a shift of the magnetic field after the recording operation has been completed. However, since the recorded information is maintained in a stable condition without being changed, a stable recording operation of the information can be achieved even with the double-layered recording layer. The initialization magnetic field thus can be made smaller.

For a fuller understanding of the nature and advantages of the invention, reference should be made to the ensuing detailed description taken in conjunction with the accompanying drawings.

BRIEF DESCRIPTION OF THE DRAWINGS

FIG. 1 shows a cross-sectional view showing the configuration of a magneto-optical recording medium.

FIG. 2 is a graph showing a perpendicular magnetic anisotropy with respect to Tb contained in TbFeCo.

FIG. 3 is a graph showing an exchange constant with respect to Co contained in TbFeCo.

FIG. 4 is a graph showing a Faraday loop in a magneto-optical recording medium.

FIG. 5 is a graph showing a Faraday loop in a magneto-optical recording medium satisfying a condition of $|A_1.K_1-A_2.K_2|=2.0$ (erg$^2$/cm$^4$).

FIG. 6 is a graph which shows results of recording on sample magneto-optical recording media.

FIG. 7 is an explanatory view of a device used in manufacturing a magneto-optical recording medium, which shows the case where the first or the second magnetic layers are formed by sputtering.

FIG. 8 is an explanatory view of a device used in manufacturing a magneto-optical recording medium, which shows the case where a dielectic layer is formed by sputtering.

FIG. 9 is an explanatory view of a device used in a method for manufacturing a magneto-optical recording medium, which shows a reverse sputtering (etching) operation of the first magnetic layer.

FIG. 10 is a graph showing a Kerr loop in the magneto-optical recording medium.

FIG. 11 is a cross-sectional view of a measured sample which clarifies an effect of a reverse sputtering (etching) operation.

FIG. 12 is a graph showing a Kerr loop in the case where a magnetic layer of the measured sample is the first magnetic layer having a single layer structure.

FIG. 13 is a graph showing a Kerr loop in the case where a magnetic layer of the measured sample is the second magnetic layer having a single layer structure.

FIG. 14 is a cross-sectional view of the magneto-optical recording medium manufactured through the method of the present invention without carrying out an reverse sputtering (etching) operation.

FIG. 15 is an explanatory view showing a coercive force dependency on a magnetic Kerr rotation angle in the magneto-optical recording medium.

FIG. 16 is a cross-sectional view showing the configuration of a magneto-optical recording medium.

FIG. 17 is an explanatory view showing a change in a light beam intensity.

FIG. 18 is a graph showing the relationship between a temperature and a coercive force of a magnetic layer.

DESCRIPTION OF THE EMBODIMENTS

The following description will discuss one embodiment of the present invention with reference to FIGS. 1 through 15.

Figure 1:
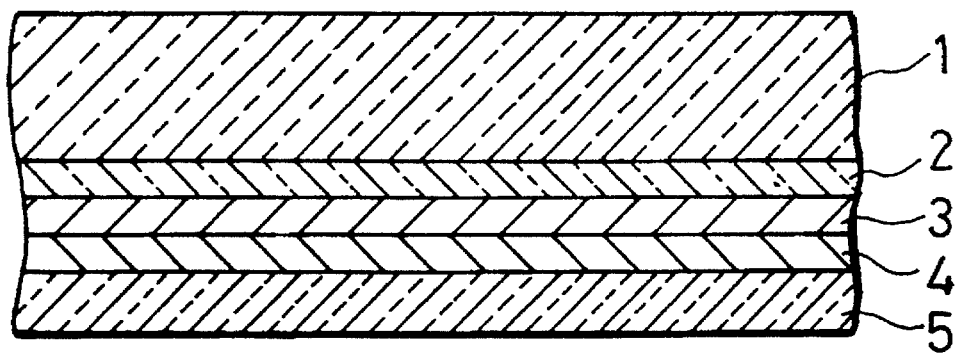
FIGS. 1 through 15 show an embodiment of the present invention.

As shown in FIG. 1, a magneto-optical recording medium is composed of a light transmitting substrate 1 made of glass having formed thereon a light transmitting dielectic layer 2 made of AlN, a first magnetic layer 3 made of TbFeCo, a second magnetic layer 4 made of TbFeCo, and a protective layer 5 made of AlN which are laminated in this order.

The magneto-optical recording medium is manufactured by forming each layer by sputtering on the light transmitting substrate 1. Additionally, the respective film thicknesses of the dielectic layer 2, the first and the second magnetic layers 3 and 4 and the protective layer 5 are respectively 80 nm, 50 nm and 80 nm.

A coating layer made of a acrylate-based resin of an ultraviolet hardening resin (not shown in FIG. 1) is formed on the protective film 5.

Figure 2:
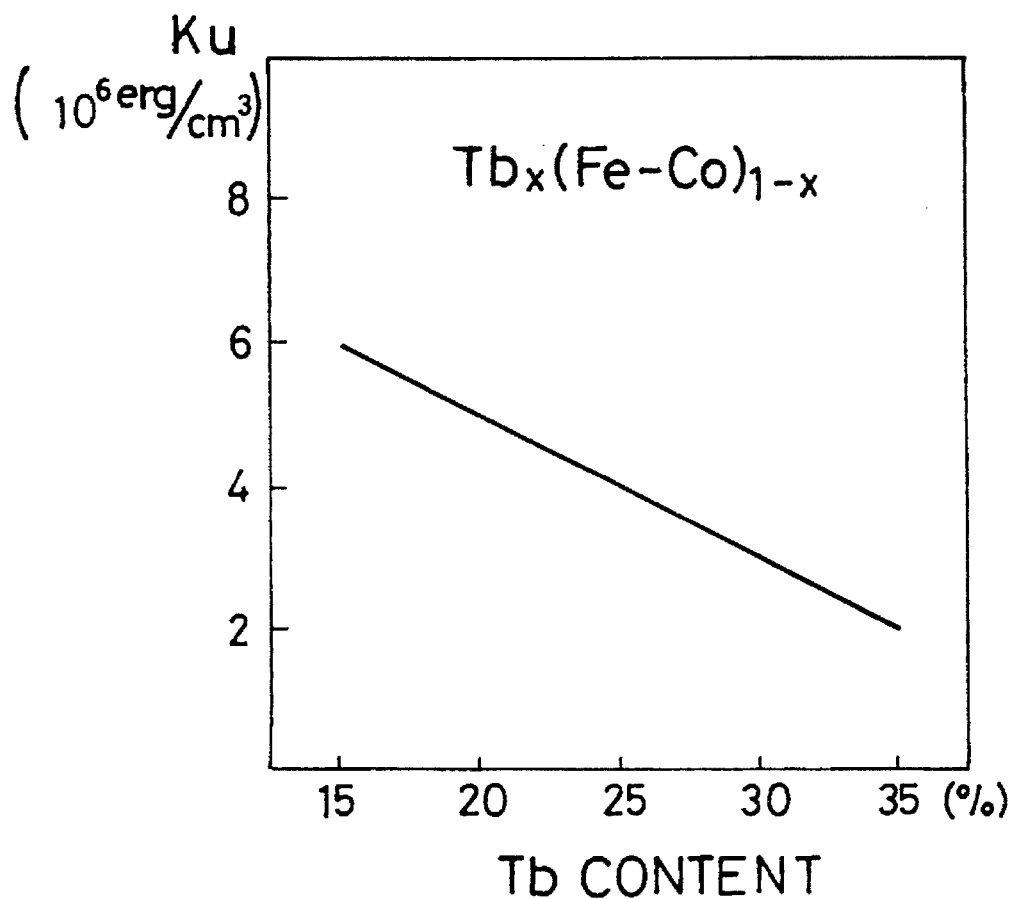
Figure 3:
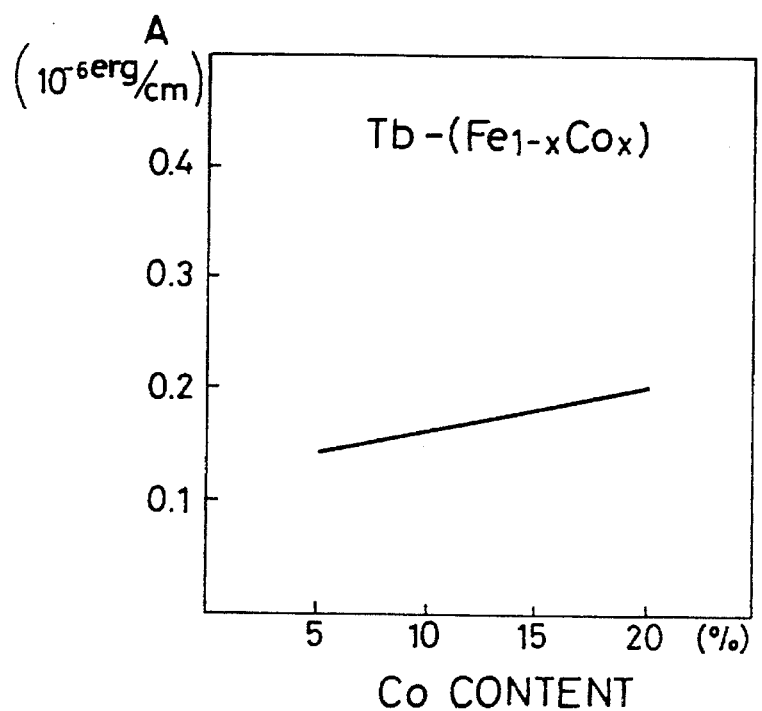

The compositions of TbFeCo for the first magnetic layer 3 and the second magnetic layer 4 are respectively $Tb_{18}Fe_{77}Co_5$ and $Tb_{25}Fe_{61}Co_{14}$. As shown in FIGS. 2 and 3, the first magnetic layer 3 satisfies that $A_1$ (exchange constant)=$0.145\times10^{-6}$ (erg/cm), and $K_1$ (perpendicular magnetic anisotropy)=$5.4\times10^6$ (erg/cm$^3$). The second magnetic layer 4 satisfies that $A_2$ (exchange constant)= $0.18\times10^{-6}$ (erg/cm), and $K_2$ (perpendicular magnetic anisotropy)=$4.0\times10^6$ (erg/cm$^3$). Thus, $|A_1.K_1-A_2.K_2|=0.06$ (erg$^2$/cm$^4$).

Figure 4:
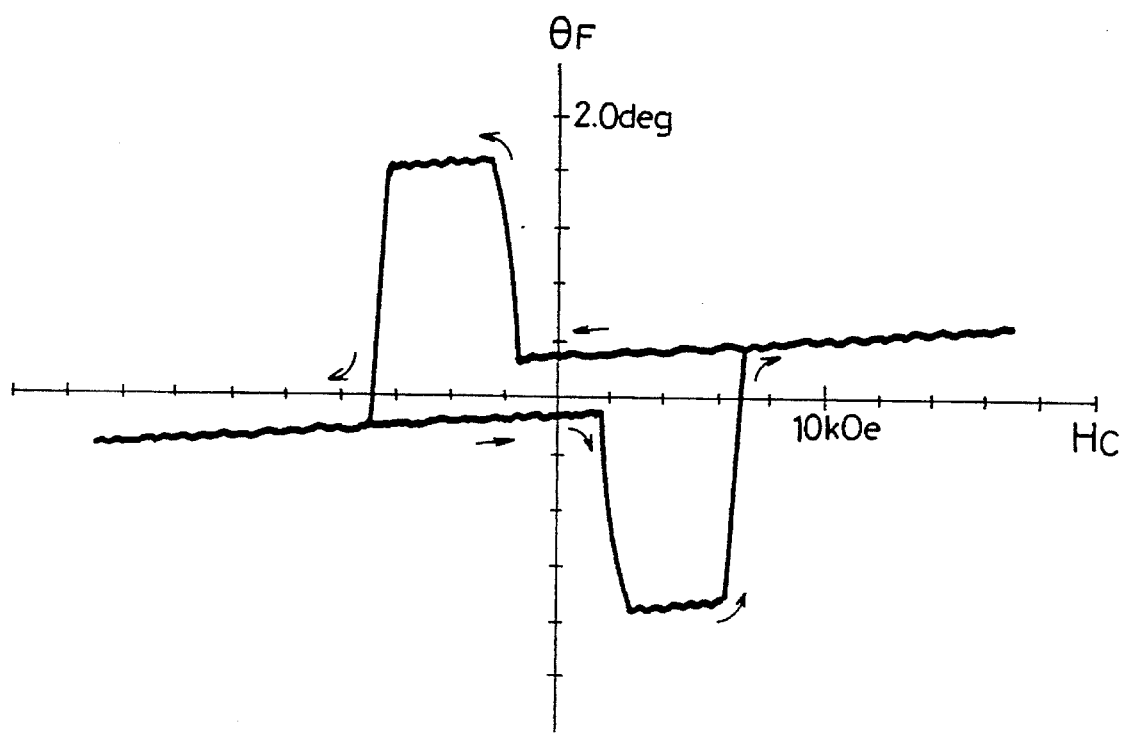
Figure 5:
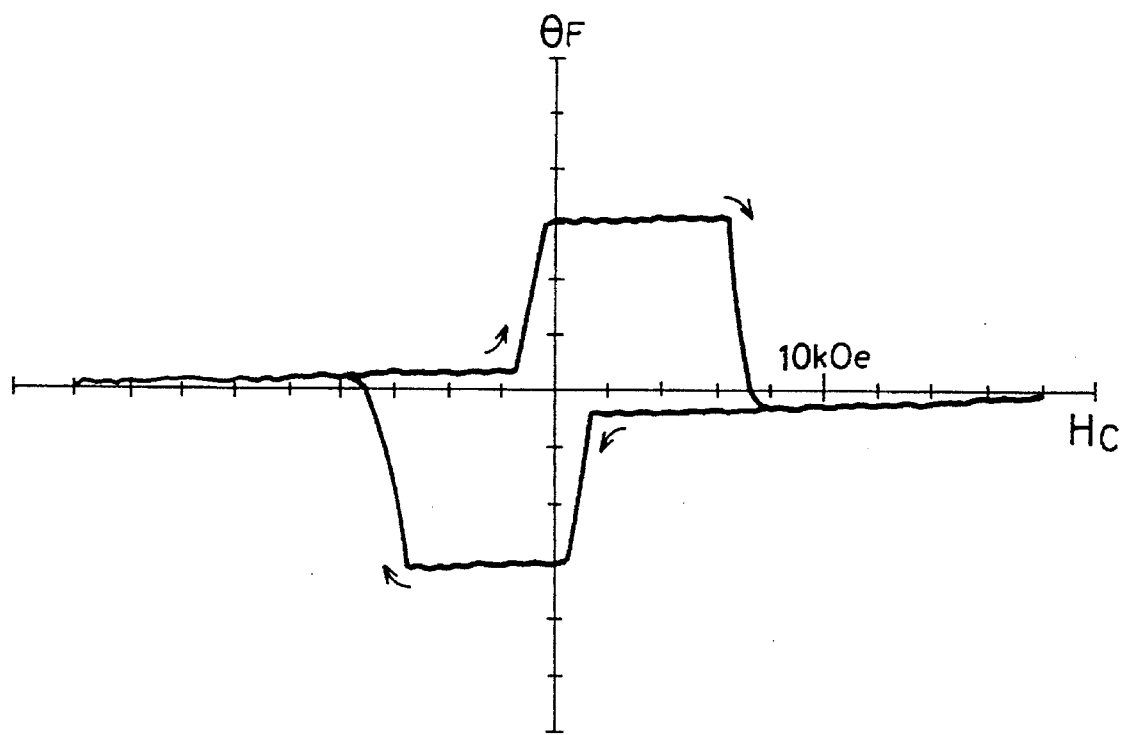

FIG. 4 is a graph showing a Faraday loop in a magneto-optical recording medium which satisfies a condition of $|A_1.K_1-A_2.K_2|=0.06$ (erg$^2$/cm$^4$) wherein a horizontal axis indicates an applied magnetic field, a vertical axis indicates a Faraday rotation angle, and an arrow shows a direction of the loop. FIG. 5, which shows a comparison example, is a graph showing a Faraday loop in a magneto-optical recording medium which satisfies the condition of $|A_1.K_1-A_2.K_2|=2.0$ (erg$^2$/cm$^4$). As can be seen from the figures, for example, in the magneto-optical recording medium of the comparison example, when the direction of the magnetic field to be applied is changed from minus direction to plus direction, the Faraday rotation angle is changed significantly when the applied magnetic field becomes close to zero. On the other hand, in the magneto-optical recording medium of the present invention, the Faraday rotation angle is not changed even when the applied magnetic field becomes close to zero, and it is significantly changed only after the applied magnetic field shows the plus direction. Namely, in the magneto-optical recording medium of the comparison example, when the magnetic field becomes zero by the shift of the applied magnetic field, the information recorded thereon is erased. For this reason, a stable recording operation cannot be achieved. On the other hand, in the magneto-optical recording medium of the present invention, the information recorded by applying the magnetic field is not erased even when the applied magnetic field becomes zero. As a result, a stable recording operation can be achieved.

The coercive force of the second magnetic layer 4 of the present invention is 2 kOe, and the intensity of the initializing magnetic field is not specified as long as it is greater than 2 kOe. Therefore, even if the intensity of the initializing magnetic field is made smaller, a stable recording operation can be ensured.

As examples of the magneto-optical recording medium, sample magneto-optical disks were manufactured, and overwriting operations were carried out on the respective samples so as to investigate their properties. As shown in Table 1, sample magneto-optical disks #1–#6 were prepared. Table 1 shows the composition (a) of the first magnetic layer 3 and the composition (b) of the second magnetic layer 4, an exchange constant A and a perpendicular magnetic anisotropy K for each of the samples #1–#6.

The sputtering conditions in forming the first magnetic layer 3 and the second magnetic layer 4 are as follows:

ultimate vacuum: $2.0 \times 10^{-4}$ Pa or below

Ar gas pressure: $6.5 \times 10^{-1}$ Pa discharge power: 300 W

The spurting conditions in forming the dielectric film 2 and the protective film 5 are as follows:

ultimate vacuum: $2.0 \times 10^{-4}$ Pa or below $N_2$ gas pressure: $3.0 \times 10^{-1}$ Pa discharge power: 800 W The protective film 5 is coated with an ultraviolet hardening acrylate based resin, and an ultraviolet ray is projected thereon so as to harden it, thereby forming an overcoat film (not shown).

Using samples #1–#6 thus manufactured, recording and reproducing operations were carried out under the following conditions:

initializing magnetic field $H_{init}$=3.0 kOe;

recording magnetic field $H_w$=300 Oe;

laser power of the High level I ($P_H$)=10 mW;

laser power of the Low level II ($P_L$)=4 mW;

reproducing laser power of level III ($P_R$)=1 mW; and recording bit length=0.78 μm.

Figure 17:
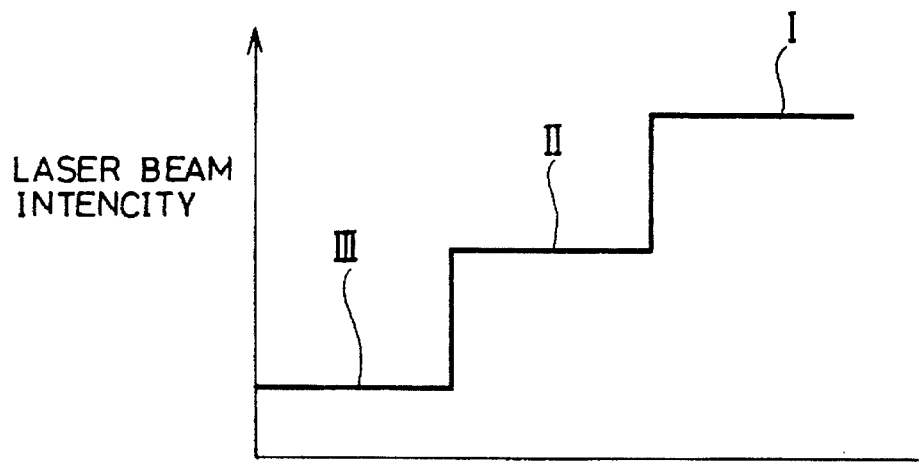
Figure 18:
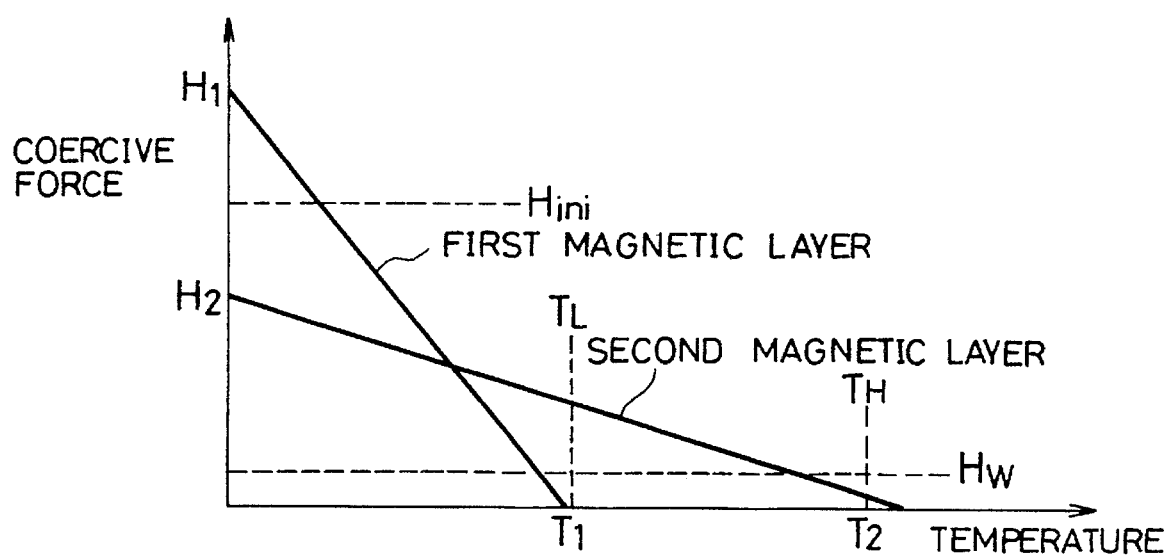

Here, each laser power is shown in FIG. 17.

Figure 6:
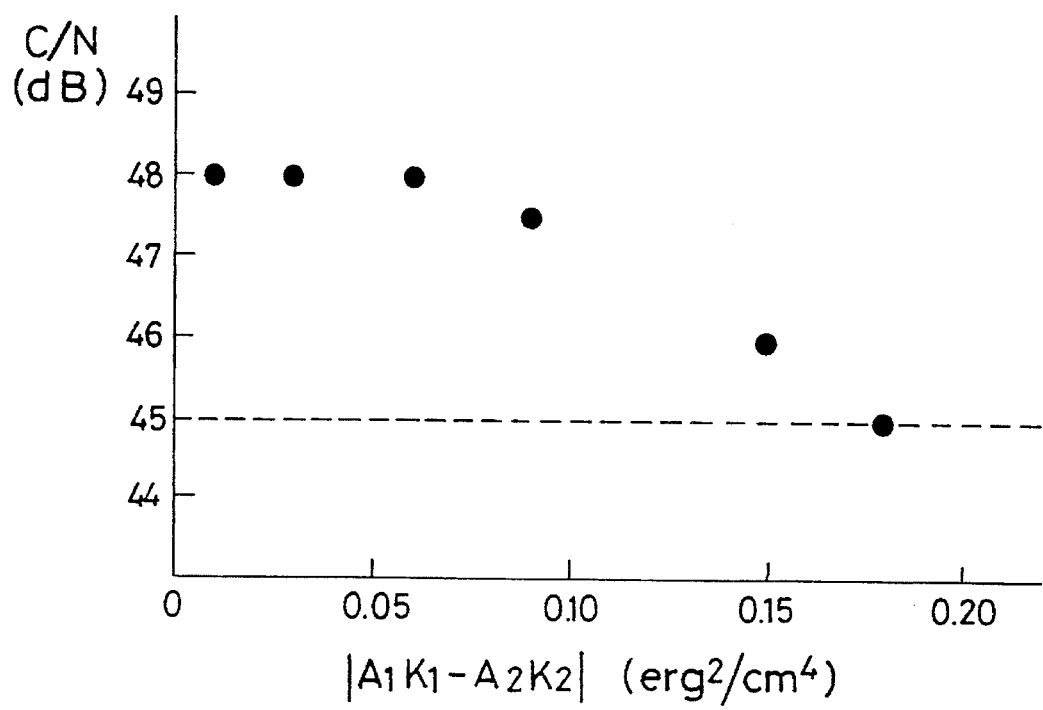

The results of the above experiments are as shown in table 1 and FIG. 6. From the experimental results, when the

TABLE 1

| Sample No. | Compositions | A (erg/cm) | K (erg/cm$^3$) | $|A_1 K_1 - A_2 K_2|$ (erg$^2$/cm$^4$) | Over-writing | C/N (dB) |
|---|---|---|---|---|---|---|
| #1 | (a)$Tb_{0.20}Fe_{0.74}Co_{0.06}$ | 0.15 | 5.0 | 0.01 | YES | 48.0 |
|  | (b)$Tb_{0.24}Fe_{0.52}Co_{0.14}$ | 0.18 | 4.2 |  |  |  |
| #2 | (a)$Tb_{0.20}Fe_{0.74}Co_{0.06}$ | 0.15 | 5.0 | 0.03 | YES | 48.0 |
|  | (b)$Tb_{0.25}Fe_{0.61}Co_{0.14}$ | 0.18 | 4.0 |  |  |  |
| #3 | (a)$Tb_{0.20}Fe_{0.76}Co_{0.04}$ | 0.14 | 5.0 | 0.06 | YES | 48.0 |
|  | (b)$Tb_{0.25}Fe_{0.60}Co_{0.15}$ | 0.19 | 4.0 |  |  |  |
| #4 | (a)$Tb_{0.18}Fe_{0.76}Co_{0.06}$ | 0.15 | 5.4 | 0.09 | YES | 47.5 |
|  | (b)$Tb_{0.26}Fe_{0.59}Co_{0.15}$ | 0.19 | 3.8 |  |  |  |
| #5 | (a)$Tb_{0.18}Fe_{0.77}Co_{0.05}$ | 0.145 | 5.4 | 0.15 | YES | 46.0 |
|  | (b)$Tb_{0.27}Fe_{0.60}Co_{0.13}$ | 0.18 | 3.5 |  |  |  |
| #6 | (a)$Tb_{0.18}Fe_{0.76}Co_{0.06}$ | 0.15 | 5.4 | 0.18 | YES | 45.0 |
|  | (b)$Tb_{0.27}Fe_{0.60}Co_{0.13}$ | 0.18 | 3.5 |  |  |  |
| Comparison | (a)$Tb_{0.18}Fe_{0.74}Co_{0.08}$ | 0.155 | 5.4 | 0.21 | NO |  |
|  | (b)$Tb_{0.27}Fe_{0.50}Co_{0.13}$ | 0.13 | 3.5 |  |  |  |

In the samples #1–#6, a light transmitting substrate 1 is made of a disk-shaped glass with a diameter of 86 mm, an inner diameter of 15 mm and a thickness of 1.2 mm. Although it is not shown, a guide track for guiding a light beam is formed on one surface of the light transmitting substrate 1 in a concave-convex shape with a pitch of 1.6 μm, a groove width of 0.8 μm and a land width of 0.8 μm. The track is formed directly on the surface of the substrate 1 by a reactive ion etching method.

On the surface of the substrate 1 whereon the guide track is formed, a dielectric film 2, the first magnetic layer 3, the second magnetic layer 4 and a protective film 5 are formed by a reactive sputtering so as to be laminated. The dielectric film 2 is made of AlN with a thickness of 80 nm. The first magnetic layer 3 and the second magnetic layer 4 are respectively made of TbFeCo with a thickness of 50 nm. The first magnetic layer 3 and the second magnetic layer 4 are respectively formed by a simultaneous sputtering using Tb, Fe and Co targets. The protective film 5 is made of AlN with a thickness of 80 nm.

condition of $|A_1.K_1 - A_2.K_2| \leq 0.18$ (erg$^2$/cm$^4$) is satisfied, an overwriting operation by the light intensity modulation is permitted, and a signal to noise ratio (C/N) of 45 dB which is required for a digital recording or even higher signal to noise ratio can be obtained.

As a comparison example, a sample magneto-optical disk which satisfies the condition of $|A_1.K_1 - A_2.K_2| = 0.21$ (erg$^2$/cm$^4$) was prepared, and an attempt was made to carry out an overwriting operation under the same conditions as the previous experiment in which overwriting operations were performed on samples #1–#6. However, an overwriting operation could not be carried out on the magneto-optical disk of this comparison example.

As described, the magneto-optical recording medium in accordance with the present invention has a recording layer including two magnetic layers. The magneto-optical recording medium is characterized by satisfying the condition of $|A_1.K_1 - A_2.K_2| \leq 0.18$ (erg$^2$/cm$^4$) wherein $A_1, K_1, A_2,$ and $K_2$ respectively represent an exchange constant of the first magnetic layer, a perpendicular magnetic anisotropy of the first magnetic layer, an exchange constant of the second magnetic layer and a perpendicular magnetic anisotropy of the second magnetic layer.

According to the above arrangement, the Faraday rotation angle of the recording layer does not change even when the applied magnetic field becomes zero. For example, after the recording operation has been completed, the applied magnetic field may become zero by a shift of the magnetic field. However, since the recorded information remains unchanged, information can be recorded in a stable condition even when a recording layer of a double-layer structure is employed, thereby enabling the initializing magnetic filed to be made smaller.

Additionally, the above configuration of the magneto-optical recording media and the materials used therein merely show preferred examples of the present invention. Thus, its configuration and the material used therein are not specified as long as the magneto-optical recording medium has a recording layer including at least two layers which satisfy the condition of $|A_1.K_1-A_2.K_2| \leq 0.18$ (erg$^2$/cm$^4$).

A method for manufacturing the magneto-optical recording medium will be described below. The magneto-optical recording medium employed in the present embodiment does not satisfy the condition of $|A_1.K_1-A_2.K_2| \leq 0.18$ (erg$^2$/cm$^4$). However, the method is also applicable to the magneto-optical recording medium which satisfy the above condition.

With the manufacturing method of the present embodiment, the light transmitting substrate 1, the dielectic layer 2, the first magnetic layer 3, the second magnetic layer 4, and the protective layer 5 are laminated in this order by sputtering. The sputtering operation is carried out, for example, in the devices shown in FIGS. 7 through 9.

Figure 8:
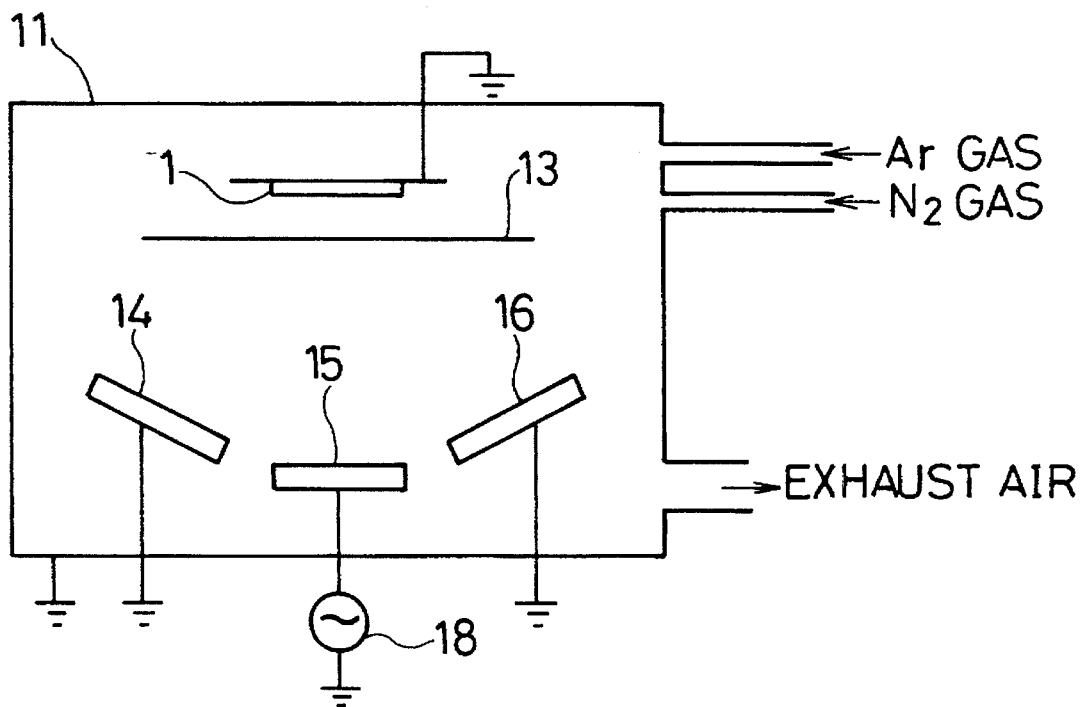

First, for example, an AlN with a thickness of 80 nm (dielectic film 2) is formed by sputtering on the light transmitting substrate 1 made of polycarbonate. More specifically, a high frequency power supply 18 is connected to an Al target 15, and a sputtering is carried out in the chamber 11 wherein Ar gas of discharge gas and $N_2$ gas of active gas (mixed gas with the ratio Ar:$N_2$= 4:1) are introduced as shown in FIG. 8. As a result, the AlN film (compound thin film) is formed on the light transmitting substrate 1. Additionally, the sputtering of the AlN film is carried out under the following conditions:

gas pressure: 8 mTorr;

application power: 1 kW; and sputtering time: 4 minutes.

Additionally, a shutter 13 is provided so as to prevent an unnecessary film to be formed on the light transmitting substrate 1.

Thereafter, for example, $Tb_{1.18}Fe_{0.72}Co_{0.10}$ with a thickness of 50 nm (the first magnetic layer 3) is formed in the chamber 11 by sputtering as an amorphous rare earth elements—transition-metal alloy film.

Figure 7:
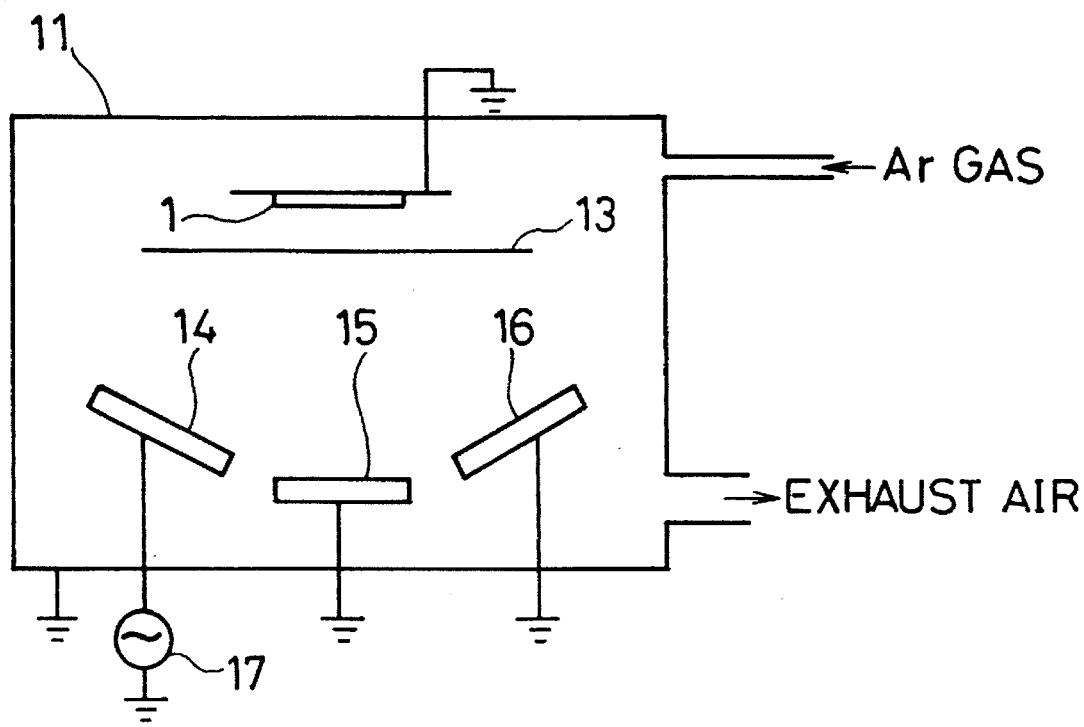

More specifically, as shown in FIG. 7, a high frequency power supply 17 is connected to a $Tb_{0.18}Fe_{0.72}Co_{0.10}$ target 14, and sputtering is carried out in the chamber 11 wherein the Ar gas (discharge gas) is introduced. As a result, $Tb_{0.18}Fe_{0.72}Co_{0.10}$ is formed on the dielectic layer 2 under the following sputtering conditions:

gas pressure: 9 mTorr;

application power: 1 kW; and sputtering time: 90 seconds.

Next, a reverse sputtering (etching) operation is carried out in the following way on the first dielectic layer 3.

Figure 9:
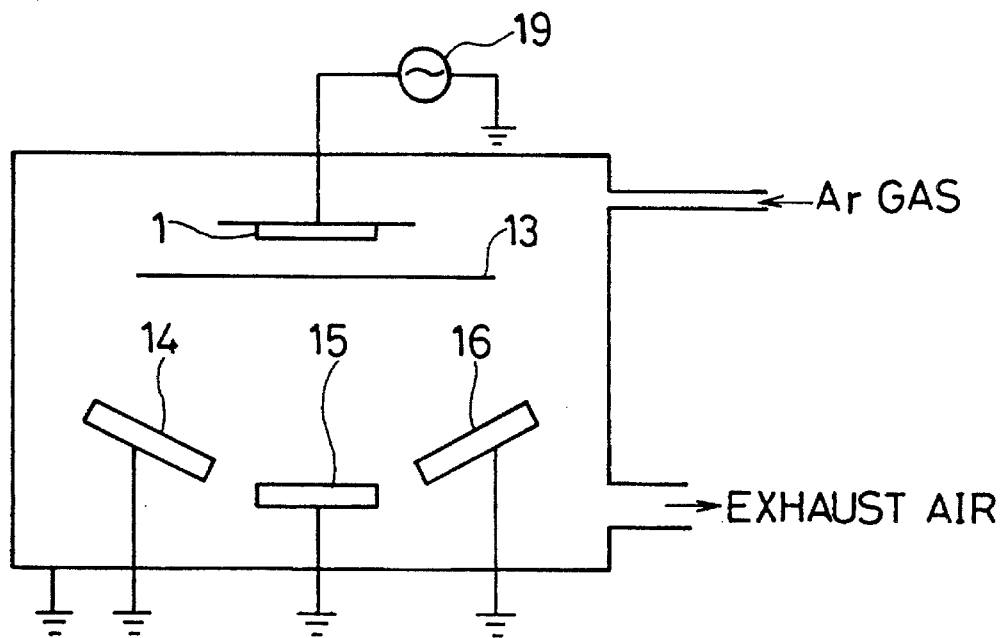

More specifically, as shown in FIG. 9, a high frequency power supply 19 is connected to the light transmitting substrate 1, and the reverse sputtering (etching) operation is carried out in the chamber 11 wherein Ar gas (discharge gas) was introduced. Here, other targets 14 through 16 are connected to ground. As a result of the reverse sputtering operation, the film thickness of the first magnetic layer 3 is reduced from 50 nm to 40 nm. Here, the sputtering conditions are as follows:

gas pressure: 9 mTorr;

application power: 700 W; and reverse sputtering time: 5 minutes.

On the first magnetic layer 3, for example, $Tb_{0.25}Fe_{0.65}Co_{0.10}$ (the second magnetic layer 4) with a thickness of 40 nm is formed by sputtering. The second magnetic layer 4 is formed in the same manner as the first magnetic layer 3. Except that the high frequency power supply is connected to the $Tb_{0.25}Fe_{0.65}Co_{0.10}$ target 16, and the $Tb_{0.18}Fe_{0.72}Co_{0.10}$ target 14 is connected to ground, the sputtering operation is carried out in the chamber 11 under the same conditions, and thus the detailed explanations thereof shall be omitted here.

On the second magnetic layer 4, for example, an AlN (protective film 5) with a thickness of 80 nm is formed by a sputtering operation. The protective film 5 is formed in the same manner as the dielectic film 2 under the same conditions, and thus the detailed explanations thereof shall be omitted.

Additionally, for convenience in the explanation, the high frequency power supplies 17–19 are separately provided in the present embodiment. However, the present invention is not limited to the above arrangement. For example, it may be arranged such that a single high frequency power supply is adopted, and the portions to be connected are selected by a switching circuit. Furthermore, DC current may be used in the sputtering operation.

Figure 10:
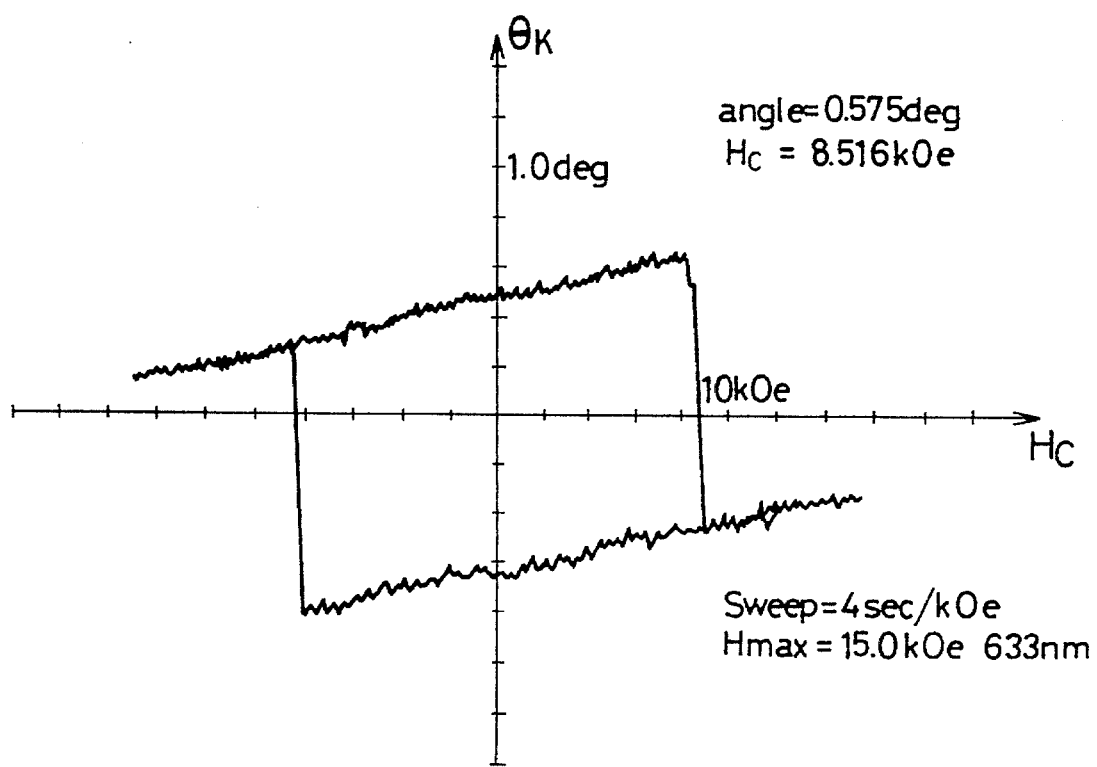

FIG. 10 is an explanatory view showing a coercive force Hc dependency on a magnetic Kerr rotation angle $\theta_k$ of the magneto-optical recording medium manufactured by the above method. As shown in FIG. 10, the measured value for the coercive force Hc of the magneto-optical recording medium manufactured through the method of the present embodiment was 8.516 kOe. The value for the coercive force can be estimated only by a magnetic wall energy stored in the magnetic wall formed on the interface. Thus, the size of the coercive force Hc will be evaluated with reference to FIGS. 11 through 15.

Figure 11:
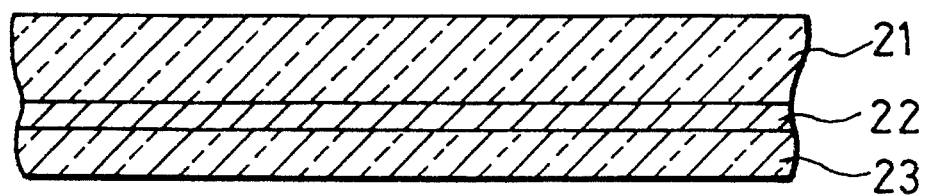

FIG. 11 shows a measured sample having the following arrangement. For a magnetic layer 22, a single layer of $Tb_{0.18}Fe_{0.72}Co_{0.10}$ or $Tb_{0.25}Fe_{0.65}Co_{0.10}$ with a thickness of 40 nm (corresponding to the first magnetic layer 3 or the second magnetic layer 4) is formed on a glass substrate 21 (with the thickness of 0.5 mm) in the same device under the same conditions. Furthermore, a protective layer 23 made of AlN with the thickness of 80 nm is formed.

Figure 12:
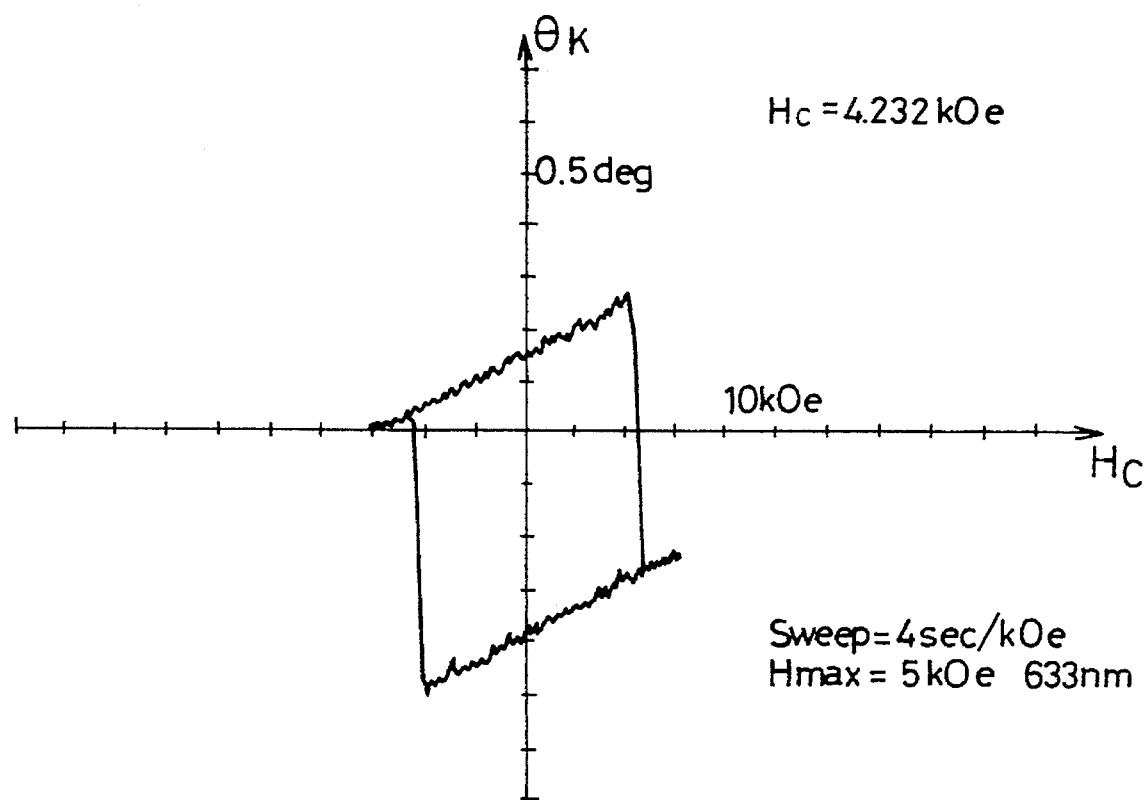

FIG. 12 shows the coercive force Hc dependency on the magnetic Kerr rotation angle $\theta_k$ in the case where only the single layer of $Tb_{0.18}Fe_{0.72}Co_{0.10}$ is formed for the magnetic layer 22. The measured value of the coercive force was 4.232 kOe.

Figure 13:
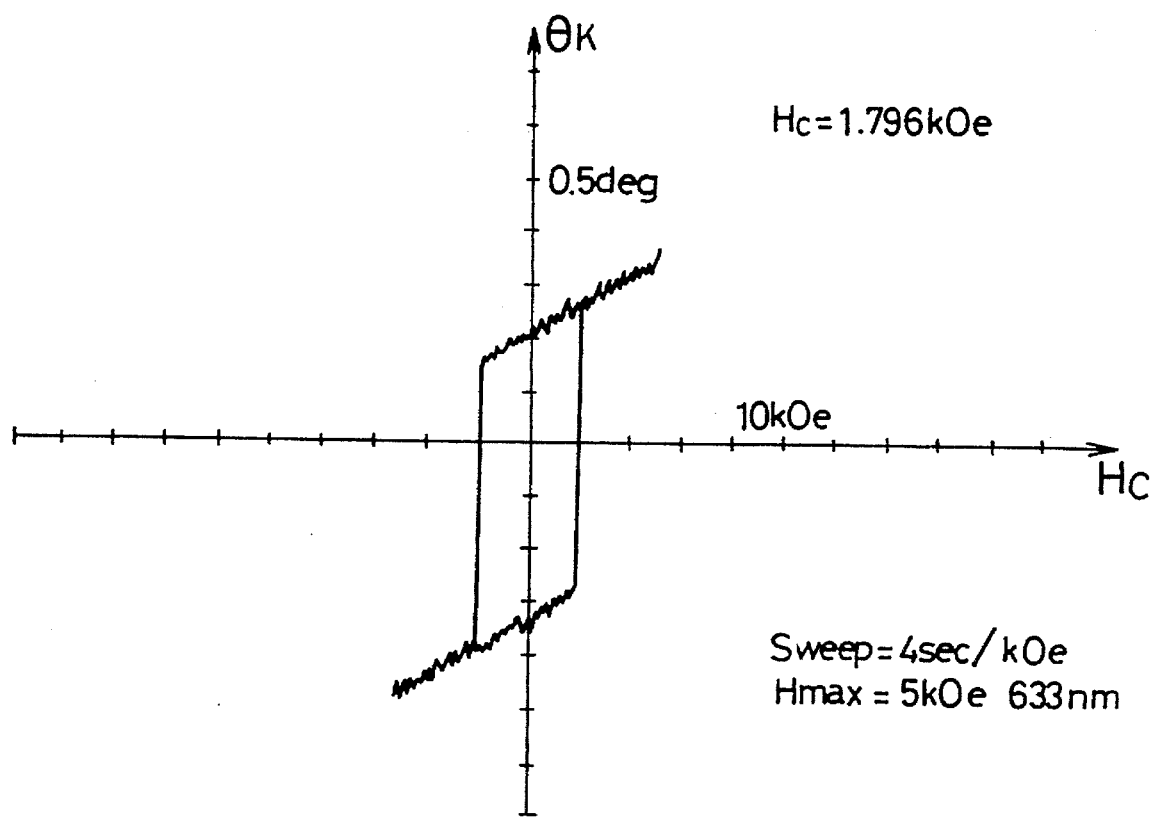

FIG. 13 shows the coercive force Hc dependency on the magnetic Kerr rotation angle $\theta_k$ in the case where only the single layer of $Tb_{0.25}Fe_{0.65}Co_{0.10}$ is formed for the magnetic layer 22. The measured value of the coercive force was 1.796 (kOe).

The magnetic layers having Kerr loops shown in FIGS. 12 and 13 are respectively the first magnetic layer 3 and the second magnetic layer 4. For the comparative example, the second magnetic layer 4 was formed directly on the first magnetic layer 3 without carrying out the reverse sputtering operation on the first magnetic layer 3, thereby obtaining the magneto-optical recording medium having a configuration shown in FIG. 14. Since the reverse sputtering operation was not carried out, the interface was made coarse as shown in the solid wave line of FIG. 14.

Figure 14:
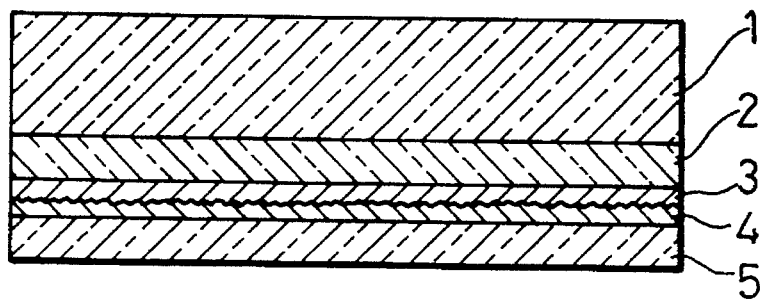
Figure 15:
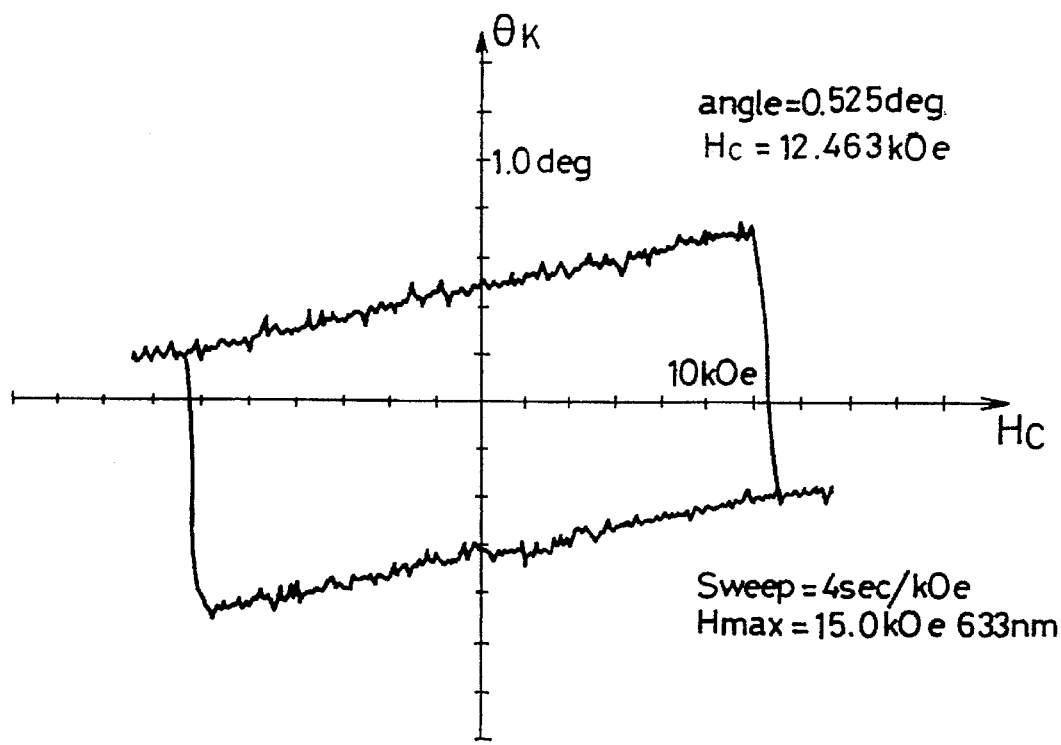
Figure 16:
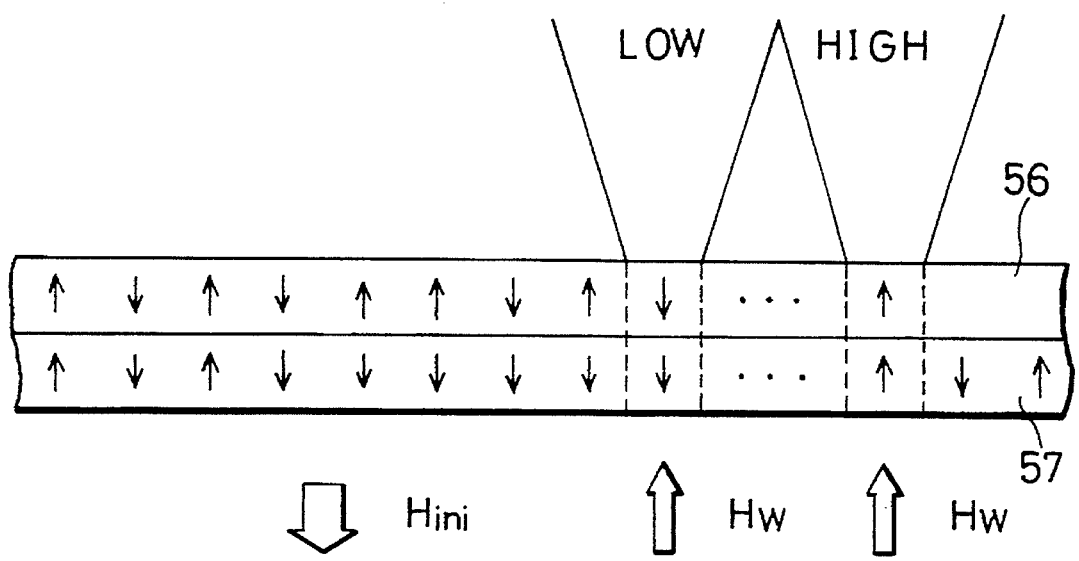
FIGS. 16 through 18 show prior art.

FIG. 15 shows the Kerr loop of the magneto-optical recording medium having the configuration of FIG. 14. As shown in FIG. 15, the measured value of the coercive force Hc was 12.463 (kOe).

As is clear from FIGS. 12 through 15, when the first magnetic layer 3 and the second magnetic layer 4 are laminated without carrying out the reverse sputtering operation, the coercive force Hc increases by the lamination of the layers, and the size of the coercive force cannot be estimated. This is because the magnetic wall energy is not the only factor of increasing the coercive force. Other factors also greatly affect an increase in the coercive force.

On the other hand, in the present embodiment, the second magnetic layer 4 is formed on the first magnetic layer 3 after carrying out the reverse sputtering operation on the first magnetic layer 3. As shown in Fig. 10, the coerce force Hc of 8.516 kOe was obtained which is 4.3 kOe greater than the single coercive force 4.232 kOe of the first magnetic layer 3. This increase in the coercive force Hc can be estimated from the magnetic wall energy when the first and second magnetic layers 3 and 4 are laminated after carrying out the reverse sputtering operation on the magnetic layer 3. Namely, in the present invention, the increase in the coercive force Hc is determined only by the energy stored in the magnetic wall formed on the interface.

In the present invention, the manufacturing method of the magneto-optical recording medium layer composed of the magnetic layers with a double-layered structure. However, the present invention is not limited to the above. For example, the manufacturing method of the present invention is also applicable to the magneto-optical recording medium composed of the magnetic layer with a three or more than three-layered structure. As to the material for the first and second magnetic layers 3 and 4, $Tb_{0.18}Fe_{0.72}Co_{0.10}$ and $Tb_{0.25}Fe_{0.65}Co_{0.10}$ have been employed. However, the present invention is not limited to the above, and any exchange coupled magnetic substances may be used.

As described, the method for manufacturing the magneto-optical recording medium in accordance with the present invention includes the step for forming the magnetic layer by a sputtering operation, the step for carrying out the reverse sputtering operation on the magnetic layer, and the step for forming the magnetic layer to be formed next on the surface of the magnetic layer whereon the reverse sputtering operation was carried out.

According to the manufacturing method, first the first magnetic layer is formed by a sputtering operation. Then, the reverse sputtering operation is carried out on the contacting face of the first magnetic layer before forming the second magnetic layer on the first magnetic layer. As a result of the reverse sputtering operation, the surface of the first magnetic layer whereon the second magnetic layer is to be formed is etched. Thereafter, the second magnetic layer is formed on the surface of the first magnetic layer, thereby obtaining the magneto-optical recording medium. After forming the second magnetic layer, the above process may be repeated according to the number of the magnetic layers so as to obtain the magneto-optical recording medium as desired. When carrying out the overwriting operation on the above magneto-optical recording medium, since the reverse sputtering operation was carried out on the surface of the first magnetic layer, the transfer of the magnetization from the second magnetic layer to the first magnetic layer can be made smoother.

Moreover, the magnetic wall energy stored in the interface between the first magnetic layer and the second magnetic layer is the only factor of increasing the coercive force of the first and second magnetic layers being laminated. This enables the magneto-optical recording medium for overwriting through the light intensity modulation wherein a plurality of magnetic layers are laminated to be numerically designed. As a result, an improvement in the quality of the magneto-optical recording medium and a reduction in the total cost can be achieved. More specifically, an improvement in the quality of the magneto-optical recording medium which satisfies the condition of $|A_1.K_1-A_2.K_2|\leq 0.18$ (erg$^2$/cm$^4$) and a reduction in the total cost can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium having a recording layer including two magnetic layers, satisfying a condition of $|A_1.K_1-A_2.K_2|\leq 0.18$ (erg$^2$/cm$^4$) wherein $A_1$, $K_1$, $A_2$, and $K_2$ respectively represent an exchange constant of a first magnetic layer, a perpendicular magnetic anisotropy of said first magnetic layer, an exchange constant of a second magnetic layer, and a perpendicular magnetic anisotropy of said second magnetic layer.

2. The magneto-optical recording medium as set forth in claim 1, wherein said first and second magnetic layers are made of TbFeCo.

3. The magneto-optical recording medium as set forth in claim 1, wherein a dielectric layer having a property that light can be transmitted therethrough, said recording layer, and a protective layer are laminated in this order on a substrate having the property that light can be transmitted therethrough.

4. The magneto-optical recording medium as set forth in claim 2, wherein respective compositions of TbFeCo for said first magnetic layer and for said second magnetic layer are $Tb_{18}Fe_{77}Co_5$ and $Tb_{25}Fe_{61}Co_{14}$.

5. The magneto-optical recording medium as set forth in claim 3, wherein a coating layer made of an acrylate resin is formed on said protective layer.

6. A magneto-optical recording medium comprising:
a recording layer consisting essentially of a first and second magnetic layer satisfying a condition of $|A_1.K_1-A_2.K_2|\leq 0.18$ (erg$^2$/cm$^4$) wherein $A_1$, $K_1$, $A_2$, and $K_2$ respectively represent an exchange constant of the first magnetic layer, a perpendicular magnetic anisotropy of said first magnetic layer, an exchange constant of the second magnetic layer, and a perpendicular magnetic anisotropy of said second magnetic layer.

7. The magneto-optical recording medium as set forth in claim 6, wherein said first and second magnetic layers are made of TbFeCo.

8. The magneto-optical recording medium as set forth in claim 6, wherein a dielectric layer having a property that light can be transmitted therethrough, said recording layer, and a protective layer are laminated in this order on a substrate having the property that light can be transmitted therethrough.

9. The magneto-optical recording medium as claimed in claim 6, wherein said recording layer consists of a first and second magnetic layer.

10. The magneto-optical recording medium as set forth in claim 7, wherein respective compositions of TbFeCo for said first magnetic layer and for said second magnetic layer are $Tb_{18}Fe_{77}Co_5$ and $Tb_{25}Fe_{61}Co_{14}$ respectively.

11. The magneto-optical recording medium as claimed in claim 7, wherein said recording layer consists of a first and second magnetic layer.

12. The magneto-optical recording medium as set forth in claim 8, wherein a coating layer made of resin is formed on said protective layer.

13. The magneto-optical recording medium as claimed in claim 8, wherein said recording layer consists of a first and second magnetic layer.

14. The magneto-optical recording medium as claimed in claim 10, wherein said recording layer consists of a first and second magnetic layer.

15. The magneto-optical recording medium as claimed in claim 12, wherein said recording layer consists of a first and second magnetic layer.

* * * * *